(12) United States Patent
Abuelsaad et al.

(10) Patent No.: US 10,277,521 B2
(45) Date of Patent: Apr. 30, 2019

(54) AUTHORIZING AN ACTION REQUEST IN A NETWORKED COMPUTING ENVIRONMENT

(71) Applicant: International Business Machines Corporation, Armonk, NY (US)

(72) Inventors: Kelly Abuelsaad, Poughkeepsie, NY (US); Lisa Seacat DeLuca, San Francisco, CA (US); Soobaek Jang, Hamden, CT (US); Daniel C. Krook, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 889 days.

(21) Appl. No.: 13/909,127

(22) Filed: Jun. 4, 2013

(65) Prior Publication Data

US 2014/0359110 A1    Dec. 4, 2014

(51) Int. Cl.
*G06F 9/50* (2006.01)
*H04L 12/911* (2013.01)

(52) U.S. Cl.
CPC ............... *H04L 47/70* (2013.01); *G06F 9/50* (2013.01)

(58) Field of Classification Search
CPC ........ G06F 9/50; G06F 9/5077; G06F 9/5412; H04L 41/5012; H04L 47/70
USPC ................................. 709/223–226; 718/104
See application file for complete search history.

(56) References Cited

U.S. PATENT DOCUMENTS

| | | | |
|---|---|---|---|
| 6,873,966 B2 | 3/2005 | Babbitt et al. | |
| 7,640,181 B2 | 12/2009 | McClure et al. | |
| 8,108,780 B2 | 1/2012 | Abernethy et al. | |
| 8,122,061 B1* | 2/2012 | Guinness | G06F 17/30292 706/11 |
| 9,183,059 B1* | 11/2015 | Fausak | H04L 41/5012 |
| 2006/0021023 A1* | 1/2006 | Stewart | G06Q 10/10 726/17 |
| 2008/0267083 A1* | 10/2008 | MacCormick | H04L 43/04 370/252 |
| 2010/0269052 A1* | 10/2010 | Uhlig | G06Q 10/06 715/752 |
| 2010/0274888 A1* | 10/2010 | Lillibridge | H04L 43/12 709/224 |

(Continued)

FOREIGN PATENT DOCUMENTS

CN     101888341 A     11/2010

OTHER PUBLICATIONS

Maitland, J., "Keeping Control Isn't Easy", Chapter 4: Cloud-Based Infrastructure, SearchCloudComputing.com, Publication Date: Oct. 2009, 17 pages.

(Continued)

*Primary Examiner* — Scott B Christensen
(74) *Attorney, Agent, or Firm* — William H. Hartwell; Madeline F. Schiesser; Keohane & D'Alessandro, PLLC (57) ABSTRACT

An approach for authorizing an action requested by a user in a networked computing environment (e.g., a cloud computing environment) is provided. In a typical embodiment, a request for a particular action associated with a computing resource is received. The connected systems which may be affected by the requested action are identified. The actual users of the connected systems are determined. A response from each of the actual users is requested. The responses are collected and weighted to determine if authorization for the requested action is granted.

20 Claims, 5 Drawing Sheets

(56) References Cited

U.S. PATENT DOCUMENTS

| | | | | |
|---|---|---|---|---|
| 2010/0319005 A1* | 12/2010 | Erignac | ............... | G06F 9/52 |
| | | | | 719/315 |
| 2012/0011296 A1* | 1/2012 | Ke | ................ | G06F 3/023 |
| | | | | 710/316 |
| 2013/0006701 A1 | 1/2013 | Guven et al. | | |
| 2014/0006078 A1* | 1/2014 | McGauley | ............ | G06Q 10/06 |
| | | | | 705/7.15 |
| 2014/0281739 A1* | 9/2014 | Tuffs | ............... | G06F 11/3452 |
| | | | | 714/47.2 |

OTHER PUBLICATIONS

Maitland, J., "Keeping Control Isn't Easy", Chapter 4: Cloud-Based Infrastructure, Search-CloudComputing.com, 13 pages.

Mell, P. et al., "The NIST Definition of Cloud Computing", National Institute of Standards and Technology, Information Technology Laboratory, Vers. 15, Oct. 7, 2009, 2 pages.

IBM, "Tivoli Application Dependency Discovery Manager", http://www-01.ibm.com/software/tivoli/products/taddm/, Date Printed Oct. 16, 2012, 2 pages.

Author Unknown, "Failover Control", Date Unknown, 43 pages.

* cited by examiner

AUTHORIZING AN ACTION REQUEST IN A NETWORKED COMPUTING ENVIRONMENT

TECHNICAL FIELD

Embodiments of the present invention relate generally to authorizing an action request by a user directed at a computing resource. Specifically, the present invention relates to collecting and weighting responses to determine whether to authorize a particular action requested by a user in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

In today's cloud computing environment, virtual machines, platform services, and software services are often shared and used by multiple users as well as other cloud systems. It is sometimes difficult to determine what impact will occur to other users and systems when an action is taken on a computing resource (hardware or software) in the cloud computing environment, such as a server reboot or an application shutdown.

SUMMARY

In general, embodiments of the present invention relate to an approach for authorizing an action requested by a user in a networked computing environment (e.g., a cloud computing environment). In a typical embodiment, a request for a particular action associated with a computing resource is received. The connected systems which may be affected by the requested action are identified. The actual users of the connected systems are determined. A response from each of the actual users is requested. The responses are collected and weighted to determine whether authorization for the requested action is granted.

A first aspect of the present invention provides a computer-implemented method for authorizing an action in a networked computing environment, comprising: receiving an action request associated with a computing resource; determining the connected systems potentially affected by the requested action; determining actual users of each of the connected systems; receiving a response from one or more of the actual users; analyzing user data associated with each responding actual user; weighting the response of each responding actual user based on the analysis; and performing the requested action when authorization is granted.

A second aspect of the present invention provides a system for authorizing an action in a networked computing environment, comprising: a memory medium comprising instructions; a bus coupled to the memory medium; and a processor coupled to the bus that when executing the instructions causes the system to: receive an action request associated with a computing resource; determine the connected systems potentially affected by the requested action; determine actual users of each of the connected systems; receive a response from one or more of the actual users; analyze user data associated with each responding actual user; weight the response of each responding actual user based on the analysis; and perform the requested action when authorization is granted.

A third aspect of the present invention provides a computer program product for authorizing an action in a networked computing environment, the computer program product comprising a computer readable storage media, and program instructions stored on the computer readable storage media, to: receive an action request associated with a computing resource; determine the connected systems potentially affected by the requested action; determine actual users of each of the connected systems; receive a response from one or more of the actual users; analyze user data associated with each responding actual user; weight the response of each responding actual user based on the analysis; and perform the requested action when authorization is granted.

A fourth aspect of the present invention provides a method for deploying a system for authorizing an action in a networked computing environment, comprising: providing a computer infrastructure being operable to: receive an action request associated with a computing resource; determine the connected systems potentially affected by the requested action; determine actual users of each of the connected systems; receive a response from one or more of the actual users; analyze user data associated with each responding actual user; weight the response of each responding actual user based on the analysis; and perform the requested action when authorization is granted.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention relate to an approach for authorizing an action requested by a user in a networked computing environment (e.g., a cloud computing environment). In a typical embodiment, a request for a particular action associated with a computing resource is received. The connected systems which may be affected by the requested action are identified. The actual users of the connected systems are determined. A response from each of the actual users is requested. The responses are collected and weighted to determine if authorization for the requested action is granted.

In performing one or more of these functions, the aspects described herein allow both a cloud provider and/or cloud consumer to procure an insurance policy to protect against data loss/SLA failures within a computing infrastructure. Such a function may involve multiple elements such as the ability to assess different insurance providers through the use of a 'risk provider' table, and then automatically apply an insurance policy to a workload processing request based on the results of this table.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
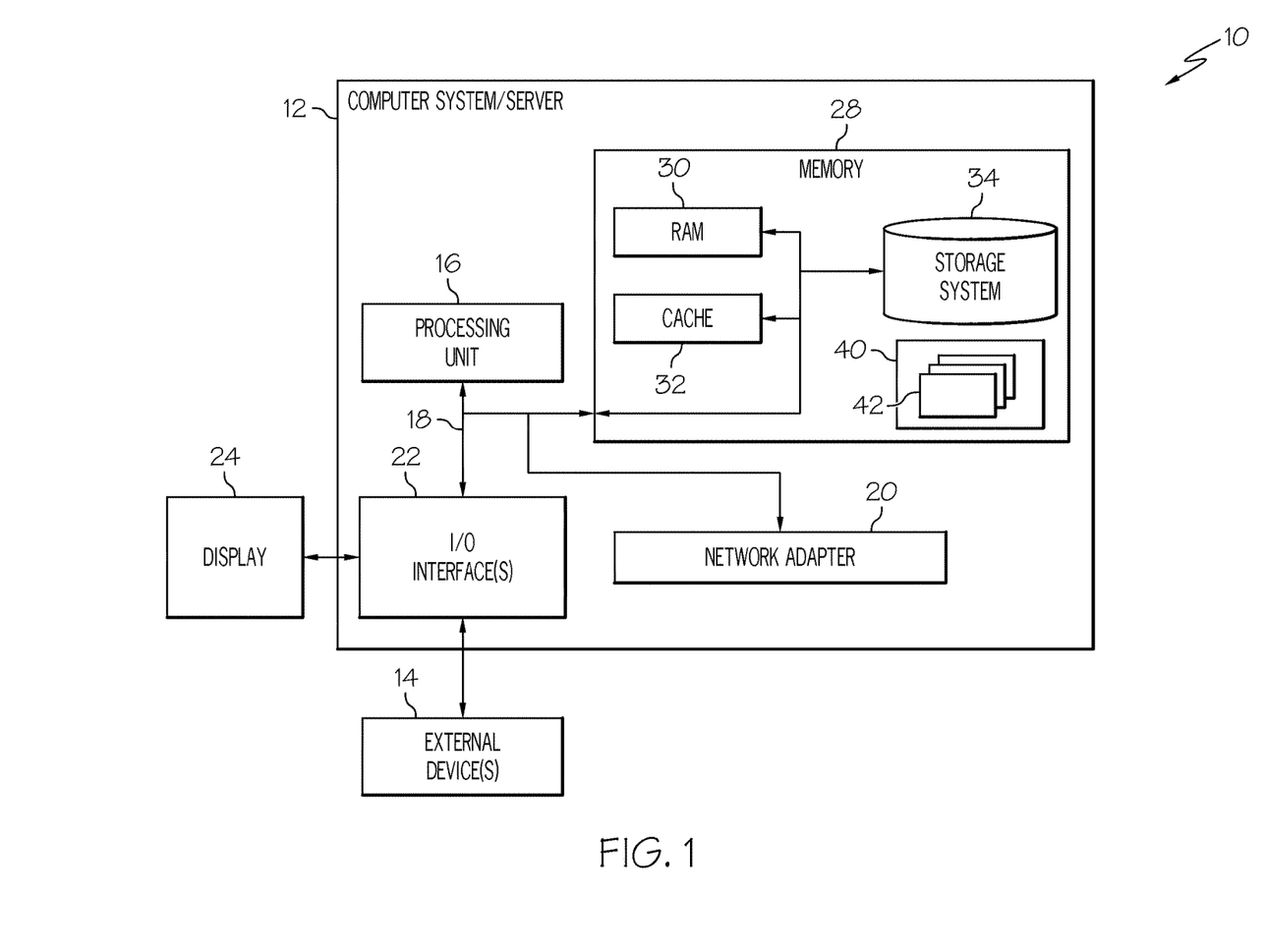
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
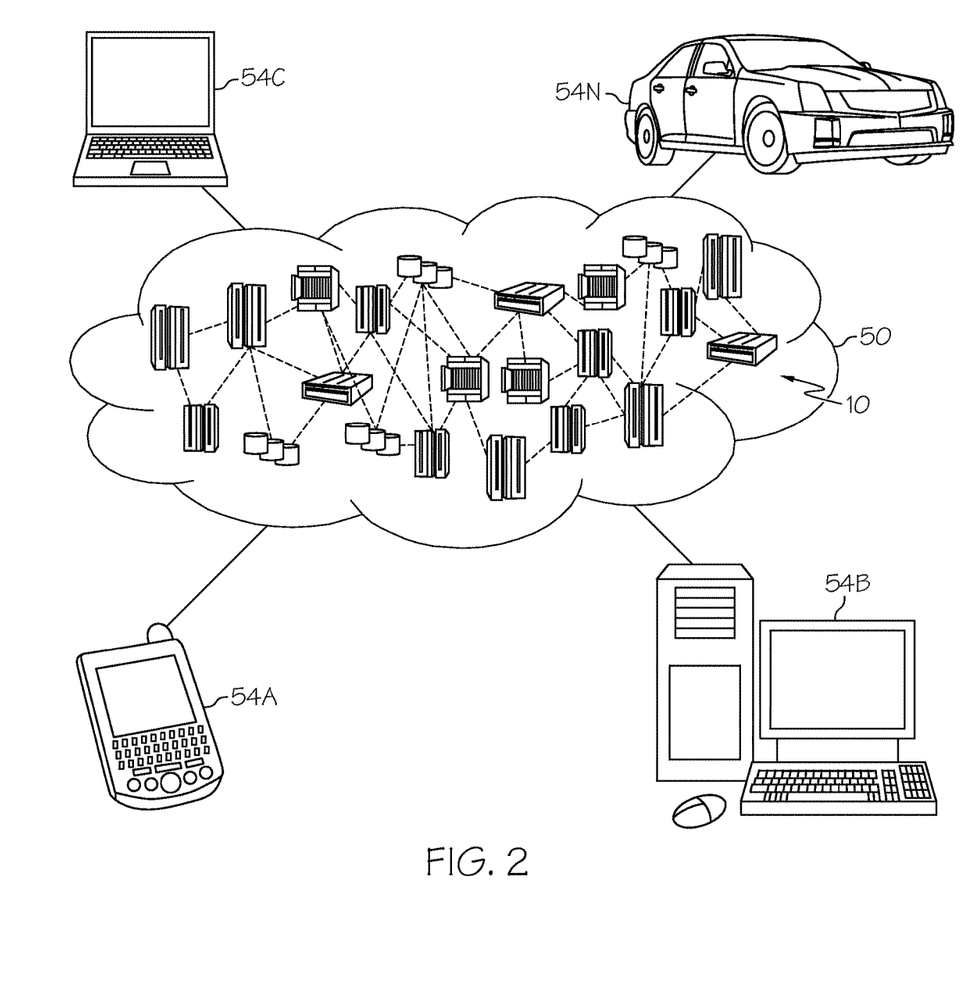
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
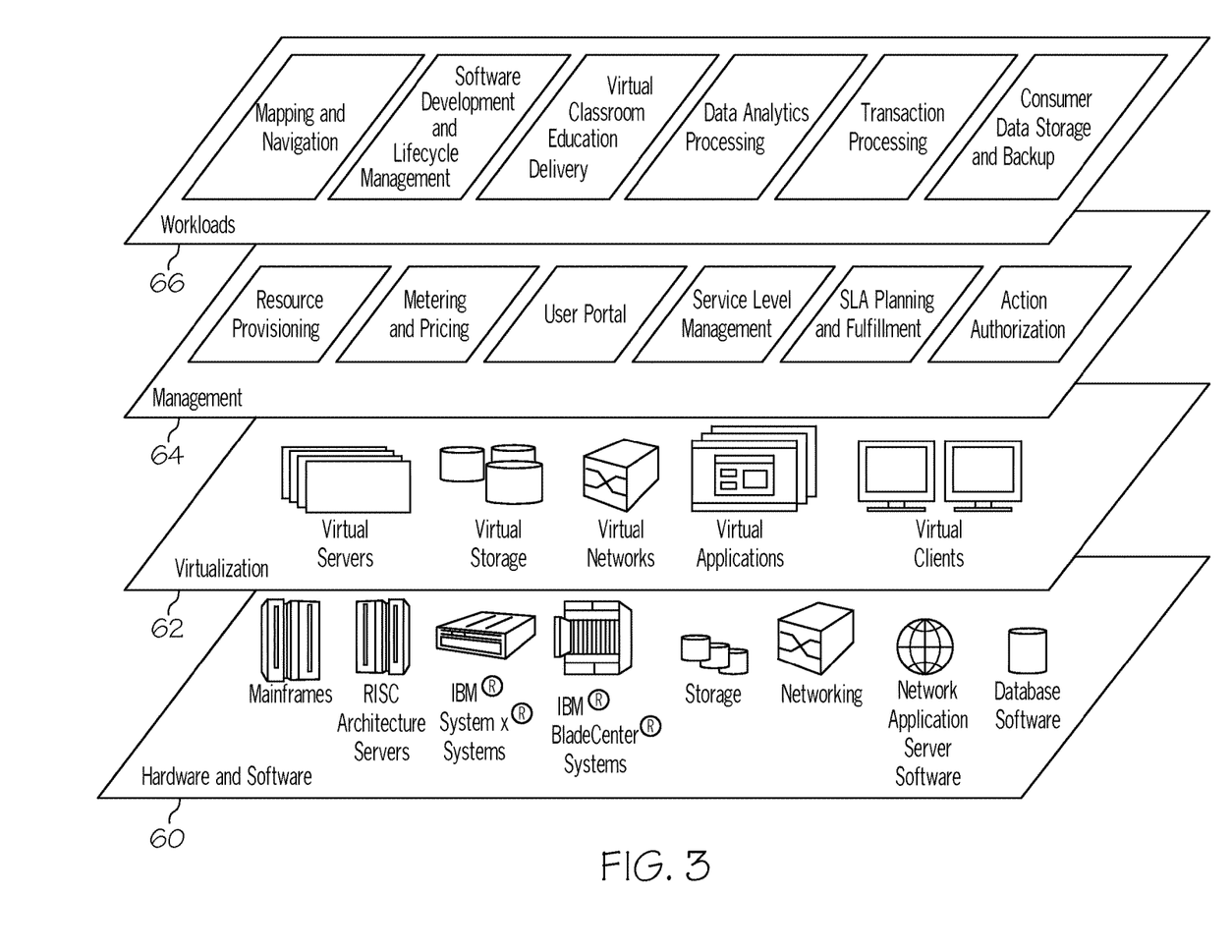
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM System P® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, system x, System p, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is action authorization, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the action authorization functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
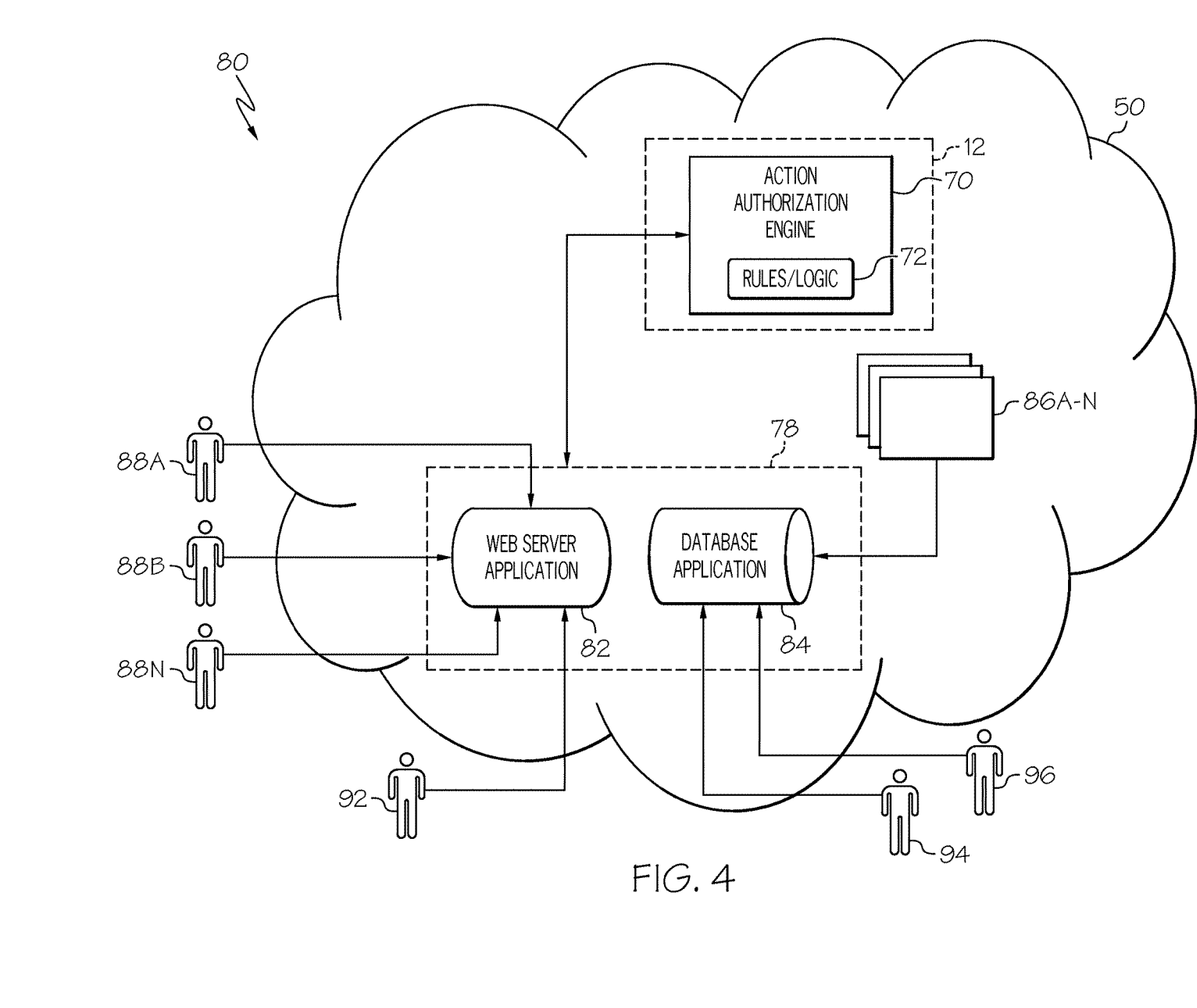
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 80 (e.g., a cloud computing environment 50). A computer system/server 12, which can be implemented as either a stand-alone computer system or as a networked computer system is shown in FIG. 4. In the event the teachings recited herein are practiced in a networked computing environment 80, each client need not have an action authorization engine (engine 70). Rather, engine 70 could be loaded on a server or server-capable device that communicates (e.g., wirelessly) with the clients to provide action authorization functionality. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules/logic 72 and/or provides action authorization hereunder.

Along these lines, engine 70 may perform multiple functions similar to a general-purpose computer. Specifically, among other functions, engine 70 may (among other things): receive an action request associated with a computing resource; determine the connected systems which may be affected by the requested action; determine the actual users of the connected systems; request a response from each of the actual users of the connected systems; analyze user data (such as the usage and/or role) associated with of each responding actual user; weight the response of each responding actual user based on the analysis; and perform the requested action when authorization is granted. The determination to grant the authorization is based on the weighted responses of the responding actual users.

Illustrative Example

This section will describe the above-discussed teachings in the context of an illustrative example. It is understood that this example (e.g., the applications, services, values, etc., recited herein) are intended to be illustrative and that other embodiments may exist within the teachings described herein.

As shown in FIG. 4, cloud computing environment 50 includes computer system 12, virtual machine (VM) 78, and application services 86A-N. Computer system 12 includes the action authorization engine (or engine) 70. Engine 70 may read rules/logic 72. VM 78 includes web server application 82 and database application 84. Web server application 82 is accessed by web users 88A-N and web server administrator 92. Database application 84 is accessed by database administrator 94 and database user 96 (performing a database query).

A request is made to perform an action (e.g., a disruptive action) associated with a computing resource (hardware or software) within the cloud computing environment 50. An "action" as used herein refers to any action associated with a computing resource that may have a disruptive effect on one or more users, services, or systems. Example actions may include, but are not limited to, rebooting an operating system of a virtual machine, shutting down or restarting an application server, shutting down or forcing connections of a database, or saving a snapshot (i.e., image) of a cloud resource which involves shutting down the resource. The request is received at engine 70. In the illustrative example, a request to reboot VM 78 is received at engine 70.

Once the request is received, engine 70 retrieves a list of systems which may be affected by the requested action. For example, if a system reboot is requested, engine 70 may detect any connected system that has any open connection to the affected computing resource. A connected system may include, but are not limited to, a cloud instance working in concert with the computing resource (e.g., a web server connected to a database server), a client system belonging to an end user, or a client system being utilized by a computing resource administrator. A client system may be identified by port, protocol, or content being accessed. In the illustrative example, web services 86A-N, the client devices of web users 88A-N, the client device of web server administrator 92, the client device of database administrator 94, and the client device of the database user 96 are identified.

Once the connected system(s) are identified, engine 70 may determine the actual user(s) of each identified connected system. If a connected system is a peer system in the cloud computing environment, engine 70 may reference a cloud system's database to find the technical owner(s) of the connected system. Furthermore, if it is known that the connection is originating from a specific application on a remote system (i.e., via analyzing the ports/protocols being used), engine 70 may reference the owner(s) of the application. In the illustrative example, the actual users are determined to be web users 88A-N, the web server administrator 92, the database administrator 94, and the database user 96.

In one example, actual user types may include, but are not limited to, active users, passive users, and/or inactive users. An active user may be any user with an open connection to the computing resource and actively engaged (e.g., running commands against) with the computing resource. A passive user may be any user with an open connection to the computing resource but not actively engaged with the computing resource. An inactive user may be any administrator or person otherwise associated with the computing resource but not actively or passively engaged with the computing resource. In other examples, other types of users may be defined.

After the actual users are determined, engine 70 may transmit a notification to each actual user requesting a response (e.g., a vote) as to whether the user authorizes the requested action. Example notifications (and responses) include, but are not limited to, email messages, text messages, instant messages, pop-up windows, mobile push notifications, and the like. In the illustrative example, a notification is sent to each of the actual users (i.e., web users 88A-N, web server administrator 92, database administrator 94, and database user 96) via an email message.

The engine 70 collects the responses from the users on whether to authenticate the requested action. Example responses may include 'yes', 'no', 'yes after an amount of time has elapsed', and 'yes after a certain action is performed'. The examples listed above are exemplary only and not intended to be limiting. Other responses may be allowed and processed by engine 70. In the illustrative example, each of the actual users respond via an email message with the administrators (web server administrator 92 and database administrator 94) and the database user 96 responding to authenticate the requested action. The remaining users send a 'no' response.

In one example, a predefined amount of time may specify the amount of time the engine 70 may wait for responses. After the amount of time has elapsed, any users not responding will not be considered when determining whether to authenticate the requested action. In one example, a user may establish a profile specifying certain actions to be taken in the event the user is not able to respond on time. For example, the user profile may specify a cleanup process be performed or any scripts saved prior to performing the requested action.

Alternatively, or in addition, the engine 70 may require the votes of a particular set of users be gathered before the requested action can be authenticated. The set of users may include users such as an application owner, a system owner, a user having a high rate of current activity, a user currently administering an application (determined by port, protocol, user role, user login ID, etc.), or the like. Other types of users may be included in the set of users.

Once the responses are received, the engine 70 may weight each of the responses based on data (such as role or usage) associated with the respective actual user. In one example, the responses of actual users having an active connection may be given a higher priority than those with an inactive connection. In another example, a user who is frequently querying a database or currently performing a long database operation may be given higher priority than a user having an open, but inactive, database connection. Administrative users may be given a higher priority than non-administrative users. Users having a particular role may be given a higher priority than users having other roles. The examples listed above are exemplary only and not intended to be limiting. Other criteria may be used when determining user priority. The process to weight each actual user response may be defined in rules/logic 72. In the illustrative example, the response from each responding actual user is weighted with the responses from the administrators (web server administrator 92 and database administrator 94) being more heavily weighted than the remaining actual users.

After weighting the responses of each responding actual user, the engine 70 may determine whether to authenticate the requested action. The decision may be based on the weighted responses. In some examples, the authentication decision may also take into consideration other factors, such as whether a sufficient failover server is readily available when the requested action involves shutting down a particular server. In the illustrative example, the decision is made to reboot the VM 78 based on the total weighted responses of the actual users. As mentioned above, all of the foregoing examples described with respect to FIG. 4 are illustrative only, and the invention is not limited to these examples.

Figure 5:
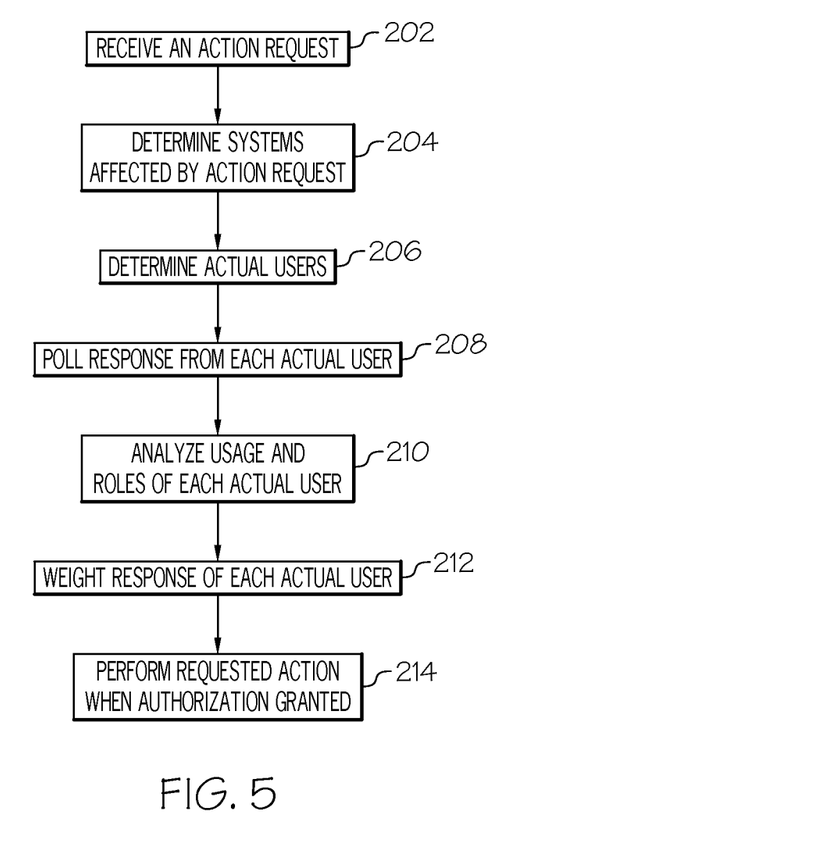
FIG. 5 depicts a method flow diagram according to an embodiment of the present invention.

Referring now to FIG. 5, a method flow diagram according to an embodiment of the present invention is shown. In step S1, an action request associated with a computing resource in the networked computing environment 80 (e.g., a cloud computing environment 50) is received. In step S2, the connected systems which may be affected by the requested action are determined. In step S3, the actual users of the connected systems are determined. In step S4, a response from each of the actual users is requested. In step S5, user data (such as usage and/or role) associated with each actual user submitting a response is analyzed. In step S6, the response of each responding actual user is weighted based on the analysis. In step S7, the requested action is performed when authorization is granted. The determination to grant the authorization is based on the weighted responses of the responding users.

While shown and described herein as an action authorization solution, it is understood that the invention further provides various alternative embodiments. For example, in one embodiment, the invention provides a computer-readable/useable medium that includes computer program code to enable a computer infrastructure to provide action authorization functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide action authorization functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for action authorization. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for minimizing an effect of a disruptive action in a networked computing environment, comprising:

receiving an action request to perform a disruptive action associated with a cloud computing resource, wherein the networked computing environment is a cloud computing environment and the disruptive action is an action that has a potential to have a disruptive effect;

determining connected systems potentially affected by the requested action from a list of systems capable of being affected by the disruptive action based on a port and a protocol being accessed by the connected systems, the connected systems having an open connection to the cloud computing resource;

determining actual users of each of the connected systems by referencing a database of the cloud computing environment to find a technical owner of each of the connected systems, wherein the actual users comprise active users having an open connection to the computing resource and being actively engaged with the computing resource, passive users having an open connection to the computing resource but not actively engaged with the computing resource, and inactive users comprising an administrator;

sending a notification requesting a response to one or more of the actual users, the notification comprising a message selected from the group consisting of: an email message, a text message, an instant message, a pop-up window, and a mobile push notification;

receiving a response to the notification from one or more of the actual users, the response comprising a response activity to be executed by the cloud computing resource, the completion of which is a condition for the user to authorize the requested action, and the response comprising a message selected from the group consisting of: an email message, a text message, an instant message, a pop-up window, and a mobile push notification;

analyzing user data comprising resource usage activity associated with each responding actual user and a role of each responding actual user;

weighting the response of each responding actual user based on the resource usage activity associated with each responding actual user and the role of each responding actual user, the weighting following a set of rules comprising: assigning a higher priority to a response of an actual user having an active connection than to a response of an actual user having an inactive connection, assigning a higher priority to a response of an actual user with a history of database querying than to a response of an actual user having an open but inactive database connection, assigning a higher priority to a response of an actual user performing a database operation than to a response of an actual user having an open but inactive database connection, and assigning a higher priority to a response of an actual user who is an administrator than to a response of an actual user who is not an administrator; and determining, based on the weighted responses, whether to grant authorization to perform the requested action, wherein the requested action is performed when authorization is granted and a sufficient failover server is available.

2. The computer-implemented method of claim 1, wherein authorization is granted based on the weighted responses.

3. The computer-implemented method of claim 1, wherein the user data comprises at least one of a data usage or user role.

4. The computer-implemented method of claim 1, wherein an actual user comprises at least one of an active user, passive user, or inactive user.

5. The computer-implemented method of claim 1, further comprising requesting a response from each actual user via a notification transmitted to each actual user.

6. The computer-implemented method of claim 5, wherein each actual user is required to respond within a predefined amount of time and wherein, in the case that an actual user does not respond within the predefined amount of time, an automated profile, comprising response instructions of the non-responsive actual user, responds.

7. The computer-implemented method of claim 6, wherein the system pauses until a set of responses are received from a particular set of actual uses, particular set of actual uses comprising at least one user selected from the group consisting of: an application owner, a system owner, a user having a rate of current activity above a threshold, and a user currently administering an application.

8. A system for minimizing an effect of a disruptive action in a networked computing environment, comprising:
   a memory medium comprising instructions;
   a bus coupled to the memory medium; and
   a processor coupled to the bus that when executing the instructions causes the system to:
      receive an action request to perform a disruptive action associated with a cloud computing resource, wherein the networked computing environment is a cloud computing environment and the disruptive action is an action that has a potential to have a disruptive effect;

determine connected systems potentially affected by the requested action from a list of systems capable of being affected by the disruptive action based on a port and a protocol being accessed by the connected systems, the connected systems having an open connection to the cloud computing resource;

determine actual users of each of the connected systems by referencing a database of the cloud computing environment to find a technical owner of each of the connected systems, wherein the actual users comprise active users having an open connection to the computing resource and being actively engaged with the computing resource, passive users having an open connection to the computing resource but not actively engaged with the computing resource, and inactive users comprising an administrator;

send a notification requesting a response to one or more of the actual users, the notification comprising a message selected from the group consisting of: an email message, a text message, an instant message, a pop-up window, and a mobile push notification;

receive a response from one or more of the actual users, the response comprising a response activity to be executed by the cloud computing resource, the completion of which is a condition for the user to authorize the requested action, and the response comprising a message selected from the group consisting of: an email message, a text message, an instant message, a pop-up window, and a mobile push notification;

analyze user data comprising resource usage activity associated with each responding actual user and a role of each responding actual user;

weight the response of each responding actual user based on the resource usage activity associated with each responding actual user and the role of each responding actual user, the weighting following a set of rules comprising: assigning a higher priority to a response of an actual user having an active connection than to a response of an actual user having an inactive connection, assigning a higher priority to a response of an actual user with a history of database querying than to a response of an actual user having an open but inactive database connection, assigning a higher priority to a response of an actual user performing a database operation than to a response of an actual user having an open but inactive database connection, and assigning a higher priority to a response of an actual user who is an administrator than to a response of an actual user who is not an administrator; and determine, based on the weighted responses, whether to grant authorization to perform the requested action, wherein the requested action is performed when authorization is granted and a sufficient failover server is available.

9. The system of claim 8, wherein authorization is granted based on the weighted responses.

10. The system of claim 8, wherein the user data comprises at least one of a data usage or user role.

11. The system of claim 8, wherein an actual user comprises at least one of an active user, passive user, or inactive user.

12. The system of claim 8, the computer readable storage media further comprising instructions to request a response from each actual user via a notification transmitted to each actual user.

13. The system of claim 12, the computer readable storage media further comprising instructions to require each actual user to respond within a predefined amount of time and, in the case that an actual user does not respond within the predefined amount of time, obtain a response from an automated profile, comprising response instructions of the non-responsive actual user.

14. The system of claim 13, wherein the system pauses until a set of responses are received from a particular set of actual uses, particular set of actual uses comprising at least one user selected from the group consisting of: an application owner, a system owner, a user having a rate of current activity above a threshold, and a user currently administering an application.

15. A computer program product for minimizing an effect of a disruptive action in a cloud computing environment, the computer program product comprising a computer readable hardware storage device, and program instructions stored on the computer readable hardware storage device, to:
  receive an action request to perform a disruptive action associated with a cloud computing resource, wherein the networked computing environment is a cloud computing environment and the disruptive action is an action that has a potential to have a disruptive effect;
  determine connected systems potentially affected by the requested action from a list of systems capable of being affected by the disruptive action based on a port and a protocol being accessed by the connected systems, the connected systems having an open connection to the cloud computing resource;
  determine actual users of each of the connected systems by referencing a database of the cloud computing environment to find a technical owner of each of the connected systems, wherein the actual users comprise active users having an open connection to the computing resource and being actively engaged with the computing resource, passive users having an open connection to the computing resource but not actively engaged with the computing resource, and inactive users comprising an administrator;
  send a notification requesting a response to one or more of the actual users, the notification comprising a message selected from the group consisting of: an email message, a text message, an instant message, a pop-up window, and a mobile push notification;
  receive a response from one or more of the actual users, the response comprising a response activity to be executed by the cloud computing resource, the completion of which is a condition for the user to authorize the requested action, and the response comprising a message selected from the group consisting of: an email message, a text message, an instant message, a pop-up window, and a mobile push notification;
  analyze user data comprising resource usage activity associated with each responding actual user and a role of each responding actual user;
  weight the response of each responding actual user based on the resource usage activity associated with each responding actual user and the role of each responding actual user, the weighting following a set of rules comprising: assigning a higher priority to a response of an actual user having an active connection than to a response of an actual user having an inactive connection, assigning a higher priority to a response of an actual user with a history of database querying than to a response of an actual user having an open but inactive database connection, assigning a higher priority to a response of an actual user performing a database operation than to a response of an actual user having an open but inactive database connection, and assigning a higher priority to a response of an actual user who is an administrator than to a response of an actual user who is not an administrator; and
  determine, based on the weighted responses, whether to grant authorization to perform the requested action, wherein the requested action is performed when authorization is granted and a sufficient failover server is available.

16. The computer program product of claim 15, wherein authorization is granted based on the weighted responses.

17. The computer program product of claim 15, wherein the user data comprises at least one of a data usage or user role.

18. The computer program product of claim 15, wherein an actual user comprises at least one of an active user, passive user, or inactive user.

19. The computer program product of claim 15, the computer readable hardware storage device further comprising instructions to request a response from each actual user via a notification transmitted to each actual user.

20. The computer program product of claim 19, the computer readable hardware storage device further comprising instructions to require each actual user to respond within a predefined amount of time and, in the case that an actual user does not respond within the predefined amount of time, obtain a response from an automated profile, comprising response instructions of the non-responsive actual user.

* * * * *